(No Model.)

J. B. ENTZ & W. A. PHILLIPS.
ELECTRODE FOR SECONDARY BATTERIES.

No. 440,023. Patented Nov. 4, 1890.

WITNESSES:

INVENTOR
Justus B. Entz,
William A. Phillips
BY

ATTORNEY.

UNITED STATES PATENT OFFICE.

JUSTUS B. ENTZ, OF NEW YORK, AND WILLIAM A. PHILLIPS, OF SCHENECTADY, ASSIGNORS TO THE WADDELL-ENTZ ELECTRIC COMPANY, OF NEW YORK, N. Y.

ELECTRODE FOR SECONDARY BATTERIES.

SPECIFICATION forming part of Letters Patent No. 440,023, dated November 4, 1890.

Application filed February 20, 1890. Serial No. 341,191. (No model.)

*To all whom it may concern:*

Be it known that we, JUSTUS B. ENTZ, a citizen of the United States, residing in New York city, in the county of New York and State of New York, and WILLIAM A. PHILLIPS, a subject of the Queen of Great Britain, residing in Schenectady, in the county of Schenectady and State of New York, have invented certain new and useful Improvements in Electric Batteries, of which the following is a specification.

Our invention relates more particularly to secondary or storage batteries, but also has reference to primary batteries.

More specifically stated, the invention relates to those batteries in which the oxide of copper forms a part, whether in the capacity of a depolarizing agent, as in primary batteries, or as the active material in the positive electrode of a secondary battery.

The invention consists of a novel form of support for the active material.

Figure 1:
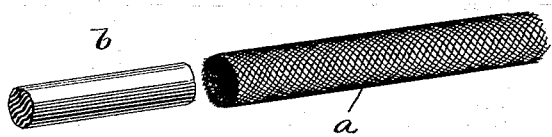
Figure 2:
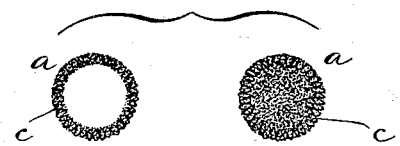
Figure 2:

In the accompanying drawings, Figure 1 represents a tube made of woven wire and the core over which it is formed, and Fig. 2 represents transverse sections of the tube with the active material in place.

This tube may be made by weaving the wire over a rod $b$ or other core, and the oxide of copper is pressed into the meshes while the core is in position. The core is then withdrawn, leaving a tubular net-work $a$, in the meshes of which is the active material $c$. It will be observed that an electrode in this form has a great amount of surface, and that it may be made as long as desired and bent into any form. We may, however, prefer to fill the space inside the tube with the oxide also, in which case it is to be put in under pressure, so that it will get into the meshes of the wire.

Having thus described our invention, we claim—

1. A support or frame for the active material of a battery, consisting of a net-work of wire in the form of a cylinder or tube.

2. A support or frame for the active material of a battery, consisting of a net-work of wire in the form of a cylinder or tube having oxide of copper embedded in its meshes.

3. An electrode for a secondary battery, consisting of oxide of copper mixed with sulphur and heated, in combination with a support for the same, consisting of a net-work of wire in the form of a cylinder or tube.

4. An electrode for a secondary battery, consisting of a tube or cylinder made of woven wire, said tube containing the active material.

5. An electrode for a secondary battery, consisting of a tube or cylinder made of woven wire, said tube containing the oxide of copper which has been previously mixed with sulphur and heated.

In witness whereof we have hereunto signed our names in the presence of two subscribing witnesses.

JUSTUS B. ENTZ.
WILLIAM A. PHILLIPS.

Witnesses as to Justus B. Entz:
  WM. A. ROSENBAUM,
  THOMAS K. TRENCHARD.

Witnesses as to William A. Phillips:
  ARTHUR VAN DER LINDE,
  CECIL S. MOORE.